Jan. 22, 1963 J. PAKSY 3,074,203
TOY CONSTRUCTIONAL OUTFIT
Filed April 27, 1959

INVENTOR.
JENÖ PAKSY
BY
Irwin S. Thompson
ATTY.

United States Patent Office 3,074,203
Patented Jan. 22, 1963

3,074,203
TOY CONSTRUCTIONAL OUTFIT
Jenö Paksy, 10 Ruszti St., Budapest II, Hungary
Filed Apr. 27, 1959, Ser. No. 809,182
2 Claims. (Cl. 46—29)

The invention concerns a construction set with tubes and tubular fittings of rigid plastic.

With such a construction set it is possible to build any desired structure by assembling tubes of different length with tubular fittings.

In order to join the tubes with the tubular fittings, such as elbows, T's, crosses, three-armed angular fittings, and the like known configurations, it is known to design the molded tubular fittings with such a diameter that the tubes can be inserted into these tubular fittings. The tube ends are slit and are slightly compressed when they are introduced into the tubular fittings, so that a resilient fit is achieved. This results in a construction which is known from pipe line assembly with the fitting screwed on the pipe ends.

According to the invention, the tubes are joined with the tubular fittings by means of hollow parts or connecting parts made of flexible plastic, which are provided with ribs on the outside and inserted so into the tubes and sockets of the fittings that the tubes and fittings are flush with their inner ends in the assembled state.

This construction of the joint has the advantage that the structures give the impression as if they were made of one piece, since there are no fittings with a larger diameter, as it is the case in the known embodiments. Apart from it, slitting of the pipe ends is eliminated, which usually requires an additional operation.

The design of the joint as a hollow connecting part with ribs according to the invention also permits reduction of the manufacturing costs, since large tolerances are admissible for the inside diameter of the tubes and tubular fittings as well as for the outside diameter of the connecting part. Nevertheless they have a very tight fit.

Figure 1:
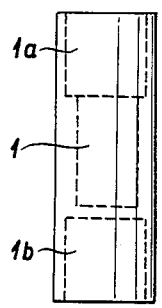
Figure 2:
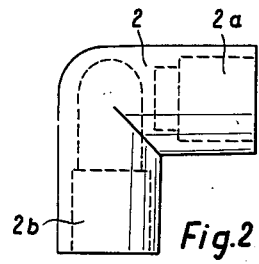
Figure 3:
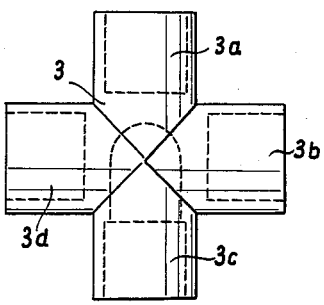
Figure 4:
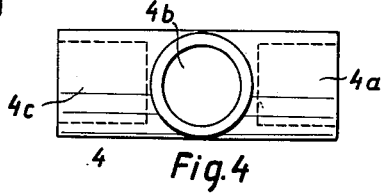
Figure 5:
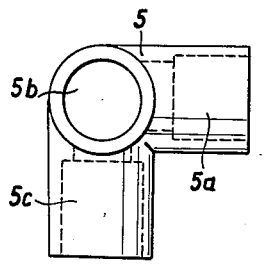
Figure 6:
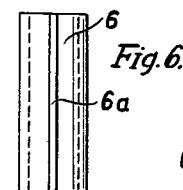
Figure 7:
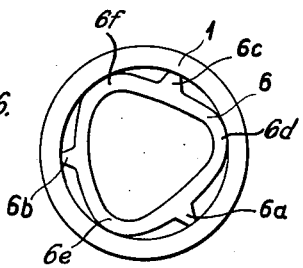
Figure 6A:
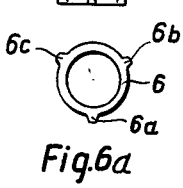
Figure 8:
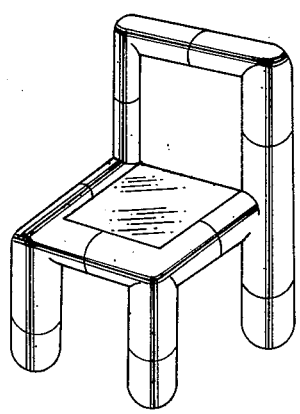

The invention is illustrated in the attached drawing, in which:

FIG. 1 is a view of a straight tube;
FIG. 2 represents an angle tube;
FIG. 3 represents a cross-shaped piece of tubing;
FIG. 4 shows a T-shaped piece of tubing, also in elevation;
FIG. 5 is the side elevation view of a three-armed angular component;
FIGS. 6 and 6a show a connecting part according to the invention in a side view and in a front view respectively;
FIG. 7 shows a front view of a tube with inserted connecting part on an enlarged scale;
FIG. 8 shows a chair assembled from tubes and adapters.

FIGS. 1–5 are, naturally, all only examples, since the outfit as per the invention can contain pieces of tubing of any shape in addition to the straight and bent pieces, and these can be used in any desired quantity. The shape of the tubings corresponds in practice to the so-called fittings used in the pipe systems of water supply installations, thus the shape which should be given to the tubings is quite well known. However, with the tubular fittings as per the invention it is important that their inner space or their bore should have a shoulder, i.e. a recessed portion as a point of contact for the connecting member. According to the drawing, the straight piece of tubing 1 has a hollow space or a bore 1a whose middle portion is narrower than the ends, so that the shoulders referred to are thus produced. The bore 1b is a so-called blind hole, i.e. it has a bottom, and this can be used as a shoulder.

Both the bores 2a and 2b of the angled tubing 2 of FIG. 2 are constructed with shoulders and the same applies to the bores 3a, 3b, 3c and 3d of the cross-shaped piece 3 of FIG. 3.

The bores are designated as 4a, 4b, 4c, 5a, 5b and 5c in FIGURES 4 and 5 respectively, and these bores also have shoulders or else they are fitted with blind holes.

The actual dimensioning is such that the depth of the bores or the distance between the outer edge of the bore and the shoulder is somewhat less than half the length of the connecting piece shown in FIGS. 6 and 6a. The result of this is that when this new-type, tubular connecting piece is inserted in the bore of a fitting and pressed down to the bottom, or to the shoulder, the other fitting can be fitted on top without difficulty because the connecting part does not extend right to the bottom or the shoulder of the second fitting.

The pieces of tubing described above have a smooth, shiny surface and are made from a stiff plastic, such as polystyrol for instance. All the shapes in an outfit can be of the same color, though if necessary, any desired colors may be used.

The hollow connecting part 6, according to FIGS. 6 and 6a, made of flexible plastic such as polyethylene, is provided with three longitudinal ribs 6a, 6b and 6c, which are evenly distributed over the circumference. This connecting part is used for joining the tubes and fittings which have such an inside diameter that the connecting part can be inserted and clamped in the tube or fitting due to its flexibility and elasticity.

The outer diameter of the connecting part 6 is less than the inner diameter of the bores of the above pieces of FIGS. 1–5, while the outer portion of ribs 6a, 6b and 6c define a diameter greater than the outer diameter of connecting part 6 as well as the inner diameter of the bores of the pieces of FIGS. 1–5.

The enlarged representation in FIG. 7 shows how the originally round cross section of the hollow connecting part 6 is deformed by its insertion into the tube 1 so as to provide additional frictional engaging portions 6d, 6e, 6f. The cross section, as shown in FIG. 7, approaches a triangular form due to the pressure on the ribs.

Because of this flexible fit, it is possible to allow in the tubes and fittings greater tolerances with regard to the inside diameter thereof and in the connecting part with regard to the outside diameter thereof, which simplifies the manufacture and reduces the costs.

When the tubes and fittings are joined by means of the inserted connecting part, they have a smooth and continuous appearance, apart from the joining lines, as it can be seen from the representation of the chair in FIG. 8. This advantage is particularly evident in those objects, such as furniture etc. compared to the design with attached sleeves, where the diameter of the individual parts varies constantly.

Having described my invention, I claim:

1. Constructional toy comprising tubes and tubular fittings of substantially rigid plastic material, and hollow connecting parts of flexible plastic material having and outer surface with less outer diameter than the inner diameter of said tubes and tubular fittings, each of said connecting parts being provided with a plurality of ribs evenly disposed on the outer surface of and parallel to the axis thereof, said ribs extending along substantially the entire length of said outer surface of each connecting part and defining an outer diameter greater than the outer diameter of said outer surface of each connecting part as well as the inner diameter of said tubes and tubular fittings so that when the connecting parts are inserted within the ends of the tubes and tubular fittings to construct a toy, the ribs engage the inner diameter thereof and the outer surface of the connecting part is deformed so as to provide additional frictional engaging portions.

2. Constructional toy according to claim 1 wherein when the connecting parts are inserted in the ends of two tubes or tubular fittings to construct said toy, these ends, as assembled are flush with each other to provide a smooth and continuous exterior surface.

References Cited in the file of this patent

UNITED STATES PATENTS

| D. 174,950 | Frishberg | June 14, 1955 |
| 337,589 | Knapp | Mar. 9, 1886 |
| 703,721 | Faber | July 1, 1902 |
| 814,367 | Given | Mar. 6, 1906 |
| 2,709,907 | Robertson et al. | June 7, 1955 |
| 2,738,584 | Parker | Mar. 20, 1956 |
| 2,958,142 | Kershaw et al. | Nov. 1, 1960 |

FOREIGN PATENTS

| 608,761 | Great Britain | Sept. 21, 1948 |
| 1,011,497 | France | Apr. 2, 1952 |
| 1,069,155 | France | Feb. 10, 1954 |
| 204,260 | Australia | Nov. 21, 1956 |